United States Patent
Hanafusa et al.

(10) Patent No.: US 8,042,636 B2
(45) Date of Patent: Oct. 25, 2011

(54) SADDLE-RIDE TYPE FOUR-WHEEL VEHICLE

(75) Inventors: Seiji Hanafusa, Saitama (JP); Akihiro Yamashita, Saitama (JP); Takuya Yamada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 357 days.

(21) Appl. No.: 12/055,549

(22) Filed: Mar. 26, 2008

(65) Prior Publication Data

US 2008/0236918 A1    Oct. 2, 2008

(30) Foreign Application Priority Data

Mar. 30, 2007  (JP) ................................ 2007-095481

(51) Int. Cl.
*B60K 11/04* (2006.01)
(52) U.S. Cl. ................. 180/68.4; 180/908; 180/292
(58) Field of Classification Search .............. 180/908, 180/292, 68.4
See application file for complete search history.

(56) References Cited

U.S. PATENT DOCUMENTS

| | | | |
|---|---|---|---|
| 4,667,758 A | 5/1987 | Tamura | |
| 4,828,017 A * | 5/1989 | Watanabe et al. | 165/41 |
| 5,575,352 A * | 11/1996 | Suzuki et al. | 180/311 |
| 5,992,554 A | 11/1999 | Hasumi et al. | |
| 6,296,073 B1 * | 10/2001 | Rioux et al. | 180/292 |
| 6,422,182 B1 | 7/2002 | Ohta | |
| 6,712,172 B2 * | 3/2004 | Inagaki et al. | 180/292 |
| 6,772,824 B1 | 8/2004 | Tsurata | |
| 6,805,214 B2 * | 10/2004 | Maeda et al. | 180/69.4 |
| 6,823,956 B2 * | 11/2004 | Shimizu | 180/68.1 |
| 6,889,788 B2 * | 5/2005 | Hakamata et al. | 180/219 |
| 6,920,949 B2 * | 7/2005 | Matsuura et al. | 180/68.2 |
| 6,966,399 B2 * | 11/2005 | Tanigaki et al. | 180/444 |
| 7,347,296 B2 * | 3/2008 | Nakamura et al. | 180/68.1 |
| 7,562,736 B2 * | 7/2009 | Eguchi et al. | 180/291 |
| 7,581,784 B2 * | 9/2009 | Ichikawa | 296/193.09 |
| 7,604,082 B2 * | 10/2009 | Yanai et al. | 180/348 |
| 7,610,132 B2 * | 10/2009 | Yanai et al. | 701/41 |
| 7,686,121 B2 * | 3/2010 | Takeshima et al. | 180/291 |
| 7,690,661 B2 * | 4/2010 | Tsuruta et al. | 280/124.135 |
| 2003/0217884 A1 * | 11/2003 | Kawamoto | 180/292 |
| 2004/0188156 A1 | 9/2004 | Karube et al. | |

(Continued)

FOREIGN PATENT DOCUMENTS

JP    61-155613 A    7/1986

(Continued)

*Primary Examiner* — Jeffrey J Restifo
(74) *Attorney, Agent, or Firm* — Birch, Stewart, Kolasch & Birch, LLP

(57) ABSTRACT

A water-cooled engine mounted on a vehicle wherein a mass concentration keeps the center of mass at a low position. In a saddle-ride type four-wheel vehicle, a radiator and a fuel tank are supported on lower frames, and are arranged, side by side, so as to be distributed respectively on the right-hand side and on the left-hand side so as to overlap each other when viewed from a side. In addition, the fuel tank and the radiator are disposed at the rear of a front suspension arm and at the rear of an engine. As a result, the concentration of mass and the keeping of the mass at a lower position are achieved. Moreover, the fuel tank and the radiator are allowed to stretch outwards beyond the upper frames. Consequently, the fuel tank can have a larger capacity and a ventilation path that leads to the radiator can be secured.

11 Claims, 14 Drawing Sheets

U.S. PATENT DOCUMENTS

| | | | |
|---|---|---|---|
| 2004/0255909 A1* | 12/2004 | Kurokawa et al. | 123/472 |
| 2005/0092266 A1 | 5/2005 | Oshima et al. | |
| 2005/0173918 A1* | 8/2005 | Eguchi et al. | 280/834 |
| 2006/0185927 A1* | 8/2006 | Sakamoto et al. | 180/443 |
| 2006/0196722 A1* | 9/2006 | Makabe et al. | 180/443 |
| 2006/0278451 A1* | 12/2006 | Takahashi et al. | 180/68.1 |
| 2007/0045015 A1* | 3/2007 | Yamamoto et al. | 180/68.5 |
| 2007/0095324 A1* | 5/2007 | Takahashi et al. | 123/198 E |
| 2007/0114814 A1* | 5/2007 | Ichikawa | 296/193.09 |
| 2007/0261906 A1* | 11/2007 | Yao et al. | 180/292 |
| 2008/0078619 A1* | 4/2008 | Mizuno et al. | 184/6.5 |
| 2008/0099263 A1* | 5/2008 | Takeshima et al. | 180/68.3 |
| 2009/0237948 A1* | 9/2009 | Oshima et al. | 362/474 |

FOREIGN PATENT DOCUMENTS

| | | |
|---|---|---|
| JP | 02-074484 A | 3/1990 |
| JP | 2006-281916 A | 10/2006 |

* cited by examiner

SADDLE-RIDE TYPE FOUR-WHEEL VEHICLE

CROSS-REFERENCE TO RELATED APPLICATIONS

The present application claims priority under 35 USC 119 to Japanese Patent Application No. 2007-095481 filed on Mar. 30, 2007 the entire contents of which are hereby incorporated by reference.

BACKGROUND OF THE INVENTION

1. Field of the Invention

The present invention relates to a saddle-ride type four-wheel vehicle. More specifically, the invention relates to an advantageous structure for disposing a fuel tank and a radiator.

2. Description of Background Art

A saddle-ride type four-wheel vehicle of a publicly-known type is sometimes equipped with a right-and-left pair front wheels as well as a right-and-left pair of rear wheels, and is provided with a handlebar for steering. In a vehicle of this type, an engine is disposed in the center of the vehicle body, and a fuel tank is disposed at the front of the engine. See, for example, Japanese Patent Application Laid-Open Publication No. 2006-281916.

A water-cooled engine is sometimes adopted as an engine for a vehicle of this type. In this case, a heavy radiator and a heavy fuel tank have to be arranged appropriately. In the arrangement, the mass of the vehicle has to be kept at a low position and has to be concentrated as much as possible.

Positioning these relatively massive assemblies is not an easy task if the above-mentioned requirements have to be met.

SUMMARY AND OBJECTS OF THE INVENTION

It is an object of an embodiment of the present invention, to provide an efficient arrangement of these assemblies. More specifically, to provide a layout satisfying the above-mentioned requirements.

For the purpose of solving the above-mentioned problems, according to an embodiment of the present invention a saddle-ride type four-wheel vehicle is provided in which front wheels are respectively disposed in a right-hand side and a left-hand side of a vehicle body frame with rear wheels being disposed likewise. An engine, a fuel tank, and a radiator are supported above the vehicle body frame. The saddle-ride type four-wheel vehicle includes a steering shaft that controls the front wheels for steering that extends in an up-and-down direction at the front of the vehicle body frame and is supported by the vehicle body frame. In addition, the fuel tank and the radiator are disposed at the rear of the steering shaft and at the front of the engine.

According to an embodiment of the present invention, the fuel tank and the radiator are disposed by distributing one of the fuel tank and the radiator on the right-hand side and the other on the left-hand side.

According to an embodiment of the present invention, the fuel tank and the radiator are disposed by distributing one of the fuel tank and the radiator at the front of the other.

According to an embodiment of the present invention, the fuel tank is disposed at a central position of the vehicle body, and the radiators are respectively disposed at the right-hand side of the fuel tank and at the left-hand side thereof.

According to an embodiment of the present invention, the fuel tank and the radiator are disposed between the engine and a suspension arm that supports the front wheels.

According to an embodiment of the present invention, the body frame includes a right-and-left pair of upper frames and a right-and-left pair of lower frames with the engine being supported between the upper frames and the lower frames. The fuel tank and the radiator are positioned below the upper frames.

According to an embodiment of the present invention, a part of the fuel tank and a part of the radiator stretch outwards beyond the right and left frames when viewed from above.

According to an embodiment of the present invention, a filler mouth of the fuel tank is provided on a front fender.

According to an embodiment of the present invention, electric equipment is disposed above the engine so as to be supported by the body frame.

According to an embodiment of the present invention, an exhaust pipe is disposed at the rear of the radiator.

According to an embodiment of the present invention, the heavy fuel tank and the heavy radiator are disposed at the rear of the steering shaft and at the front of the engine. Accordingly, the mass can be kept at a low position and can be concentrated.

According to an embodiment of the present invention, the fuel tank and the radiator are disposed by distributing one of the fuel tank and the radiator on the right-hand side and the other on the left-hand side. Accordingly, while the fuel tank with a large capacity can be utilized, an air ventilating path that leads to the radiator can be secured. In addition, such an arrangement helps to balance the weight in the right-and-left direction.

According to an embodiment of the present invention, the fuel tank and the radiator are disposed by distributing one of the fuel tank and the radiator at the front of the other. Accordingly, while the fuel tank with a large capacity can be disposed, an air ventilating path that leads to the radiator can be secured. In addition, the mass can be kept at a low position and can be concentrated.

According to an embodiment of the present invention, the fuel tank is disposed at a central position of the vehicle body, and the radiators are respectively disposed at the right-hand side of the fuel tank and at the left-hand side thereof. Accordingly, while the fuel tank with a large capacity can be utilized, an air ventilating path that leads to the radiator can be secured. In addition, such an arrangement helps to balance the weight in the right-and-left direction.

According to an embodiment of the present invention, the fuel tank and the radiator are disposed between the engine and a suspension arm that supports the front wheels. Accordingly, the mass can be concentrated.

According to an embodiment of the present invention, the body frame includes a right-and-left pair of upper frames and a right-and-left pair of lower frames. In addition, the engine is supported between the upper frames and the lower frames, and the fuel tank and the radiator are positioned below the upper frames. Accordingly, the mass can be kept at a low position.

According to an embodiment of the present invention, a part of the fuel tank and a part of the radiator stretch outwards beyond the right and left frames when viewed from above. Accordingly, each of the fuel tank and the radiator can have a larger capacity while an air ventilating path that leads to the radiator can be secured.

According to an embodiment of the present invention, a filler mouth of the fuel tank is provided on a front fender.

Accordingly, the fuel tank can extend in the upward direction of the vehicle body and can thus have a larger capacity.

According to an embodiment of the present invention, electric equipment is disposed above the engine so as to be supported by the body frame. Accordingly, such an arrangement can contribute to the concentration of mass while the electric equipment can be placed in a position where splashed water is unlikely to reach.

According to an embodiment of the present invention, an exhaust pipe is disposed at the rear of the radiator. Accordingly, the exhaust pipe is exposed to the wind delivered by the radiator. Thus, the cooling down of the exhaust pipe can be promoted.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
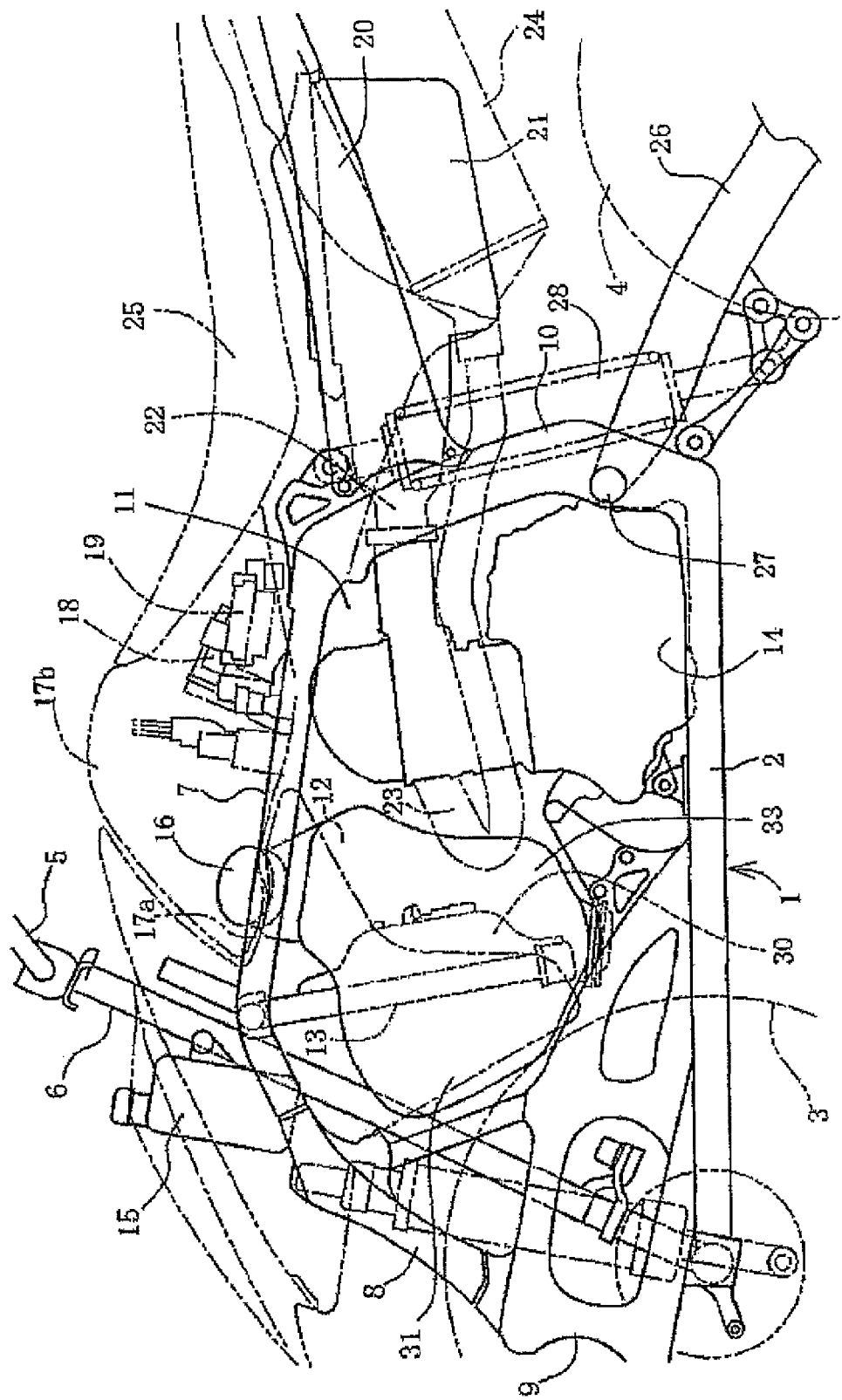
FIG. 1 is a side elevation view of a four-wheel buggy vehicle.

Hereinbelow, an embodiment of the present invention will be given with reference to the accompanying drawings. FIGS. 1 to 6 relate to a first embodiment of the present invention, which is an application of the invention to a four-wheel buggy vehicle. FIG. 1 is a side elevation of the buggy vehicle. A body frame 1 includes lower frames 2. A right-and-left pair of front wheels 3 and a right-and left pair of rear wheels 4 are provided respectively at the front and at the rear of the lower frames 2. The right and the left front wheels 3 are supported by the body frame 1 with independent suspension systems, and are controlled by a handlebar 5, which turns a steering shaft 6.

The body frame 1 includes upper frames 7, each of which is provided above and in parallel with the corresponding one of the lower frames 2. A front frame, also included in body frame 1, extending obliquely downwards to the front from the front end portions of the upper frames 7. In addition, the body frame 1 includes a suspension frame 9, which connects the bottom end portion of the front frame 8 to the front end portions of the lower frames 2, and pivot frames 10, each of which extends vertically to connect the rear end of each lower frame 2 and the rear end of the corresponding upper frame 7.

With these components, the body frame 1 substantially forms a loop when viewed from the side. Within a space 11, formed by being surrounded by the body frame 1, an engine 14 is disposed at the rear of a fuel tank 12. A radiator 13 is disposed in the front side of the space 11. The fuel tank 12 and the radiator 13 partially overlap when viewed from the side. Both the fuel tank 12 and the radiator 13 are disposed below the upper frames 7.

The radiator 13 is connected to a water jacket of the engine 14 with an unillustrated water hose, and cools the engine down with circulating cooling water. A reservoir tank 15 is provided, and in order to support the bottom of the reservoir tank 15, a stay (not illustrated) is provided in the top-end portion of the front frame 8.

The radiator 13 is supported at its upper-end portion by the front-end portion of each upper-frame 7, while the rear-end portion of the radiator 13 is supported on the rear portion of the suspension frame 9. The radiator is disposed with its top-side portion leaning forward. In other words, the radiator as a whole is in a forward tilt position. Such an arrangement of the radiator is determined by taking account of the driving wind blowing from the front side of the vehicle. This is because the radiator, receiving such a wind, cools the engine down more efficiently.

The fuel tank 12 is supplied with a cap 16 at a top-end portion thereof. A part of the cap 16 sticks out above the upper frames 7 and above a front fender 17a as well when viewed from the side. The part of the cap 16 sticks out inside a top cover 17b, which is provided over the upper frames 7 and is raised to seemingly have a hill shape. The user can refill the fuel tank 12 from above by opening an unillustrated lid provided in the top cover 17b.

Electric equipment such as a battery 18 and an ECU 19 is accommodated inside the top cover 17b, and is supported by the top of the upper frame 7. The lower part of the fuel tank 12 is supported by the rear portion of the suspension frame 9.

The air is taken into the engine 14 through a connecting tube 22 from an air cleaner 21 supported by seat rails 20 that extends to the rear from an upper portion of the pivot frame 10. An exhaust pipe 23 extends forwards from the cylinder head. The exhaust pipe 23 is then bent back and extends to the rear to be connected with a muffler 24, which partially overlaps the air cleaner 21 when viewed from a side.

A seat 25 is supported on the seat rails 20. Below the seat 25, rear wheels 4 are supported respectively at the rear ends of rear arms 26. The front end of each rear arm 26 is swingably supported by a pivot 26 at a lower portion of the corresponding one of the pivot frames 10. Rear shock absorbers 28 are provided for the rear suspension systems.

Figure 2:
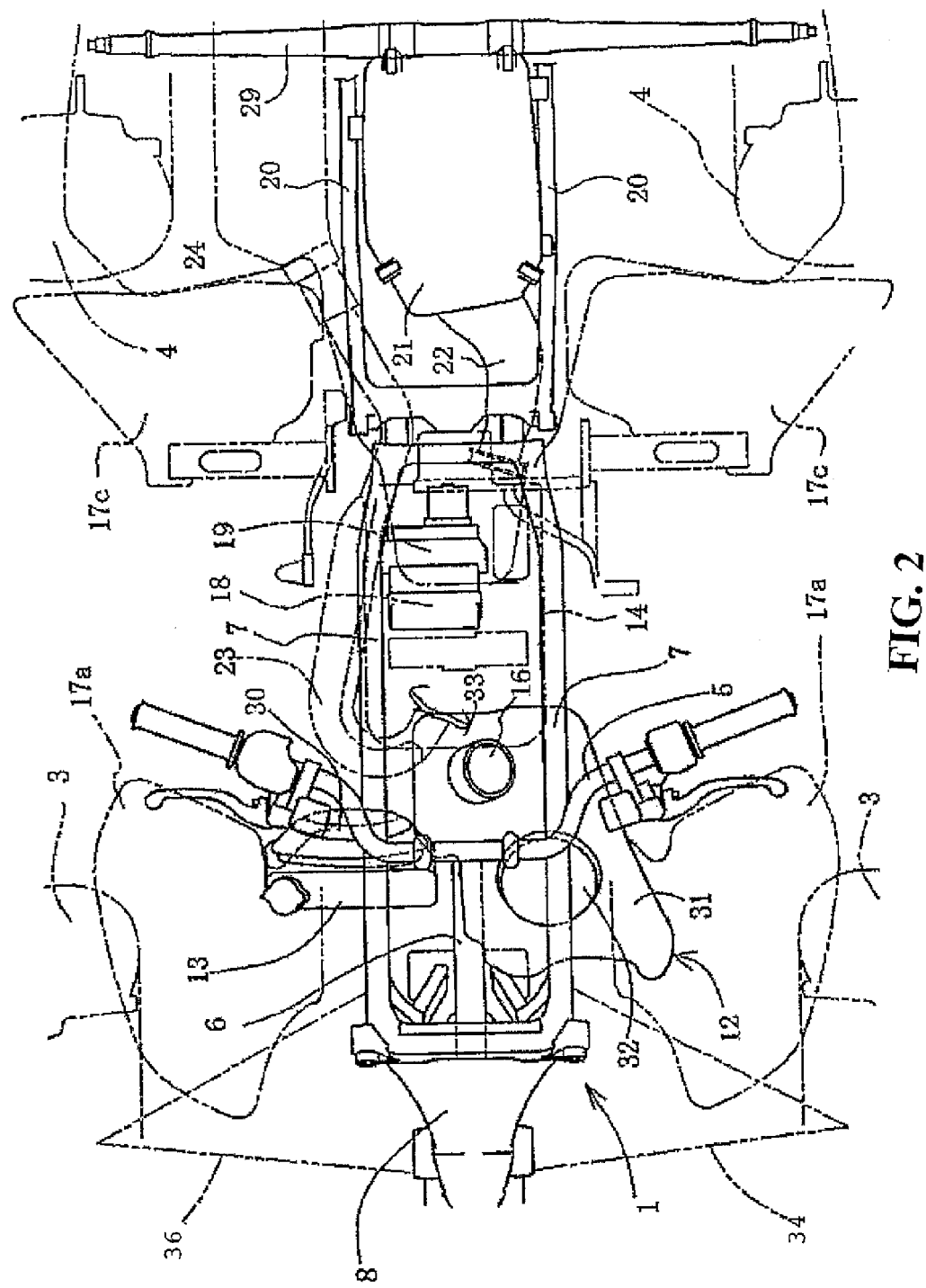
FIG. 2 is a top plan view of the four-wheel buggy vehicle.

FIG. 2 is a top plan view of this four-wheel buggy-type vehicle. The lower frames 2 are provided as a right-and-left pair in parallel with each other. The upper frames 7 are provided as a right-and-left pair in parallel with each other. The fuel tank 12 and the radiator 13 are disposed by being distributed respectively on the two sides of the vehicle body. In this embodiment, the fuel tank 12 is placed on the left-hand side of the vehicle body while the radiator 13 is on the right-hand side thereof. The radiator 13 is disposed across the right-side upper frame 7 and stretches both inwards and outwards. Substantially more than half in the width direction of the radiator 13 stretches outwards beyond the upper frame 7. Such an arrangement allows the radiator 13 to have a larger capacity. In addition, the arrangement, which allows less shielding to exist in front of the radiator 13, makes it possible to secure an air ventilating path that leads to the radiator 13.

A cooling fan 30 is provided on the back-side surface of the radiator 13. Most of the cooling fan 30 is located at the right-outer side of the upper frame 7. The exhaust pipe 23 is located at the rear of the radiator 13 so that the wind delivered by the radiator 13 can blow onto the exhaust pipe 23. Thus, the exhaust pipe 23 can be cooled down more efficiently.

The fuel tank 12 has a substantially L-shape when viewed from above. A forward-stretching portion 31 stretches out forward at a side of the radiator 13, and a fuel pump 32 is attached to the top surface of the forward-stretching portion 31. An inward-stretching portion 33, which stretches in the width direction, stretches out towards the center of the vehicle body until the inward-stretching portion 33 comes close to the left-hand side portion of the radiator 13.

The fuel tank 12, specifically, the forward-stretching portion 31 and a left-hand side part of the inward-stretching portion 33, also stretches out-leftwards beyond the left-side upper frame 7. Note that the way the fuel tank 12 stretches out beyond the upper frame 7 differs the way the radiator 13 stretches out. A lesser part of the fuel tank 12 stretches leftwards outside of the upper frame 7 than the part thereof located at the inner side of the upper frame 7.

The intention of such an arrangement is to allow the fuel tank 12 to have a larger capacity, and to prevent the weight of the fuel tank 12 from being disproportionately distributed. Moreover, the fuel tank 12, together with the radiator 13, balances the weight in the right-and-left direction and helps to concentrate the mass in the central side of the vehicle.

Both the fuel tank 12 and the radiator 13 are placed at the rear of a front suspension arm 36 and in front of the engine 14. Note that both the front suspension arm 36 and the engine 14 are depicted in a simplified way in FIG. 2. Such positioning of the fuel tank 12 and the radiator 13, both of which are heavy in weight, helps achieve the concentration of mass. Supporting the fuel tank 12 and the radiator 13 with the suspension frame 9 helps to keep the center of mass at a lower position.

FIG. 2 also shows rear fenders 17c and a rear axle 29.

Figure 3:
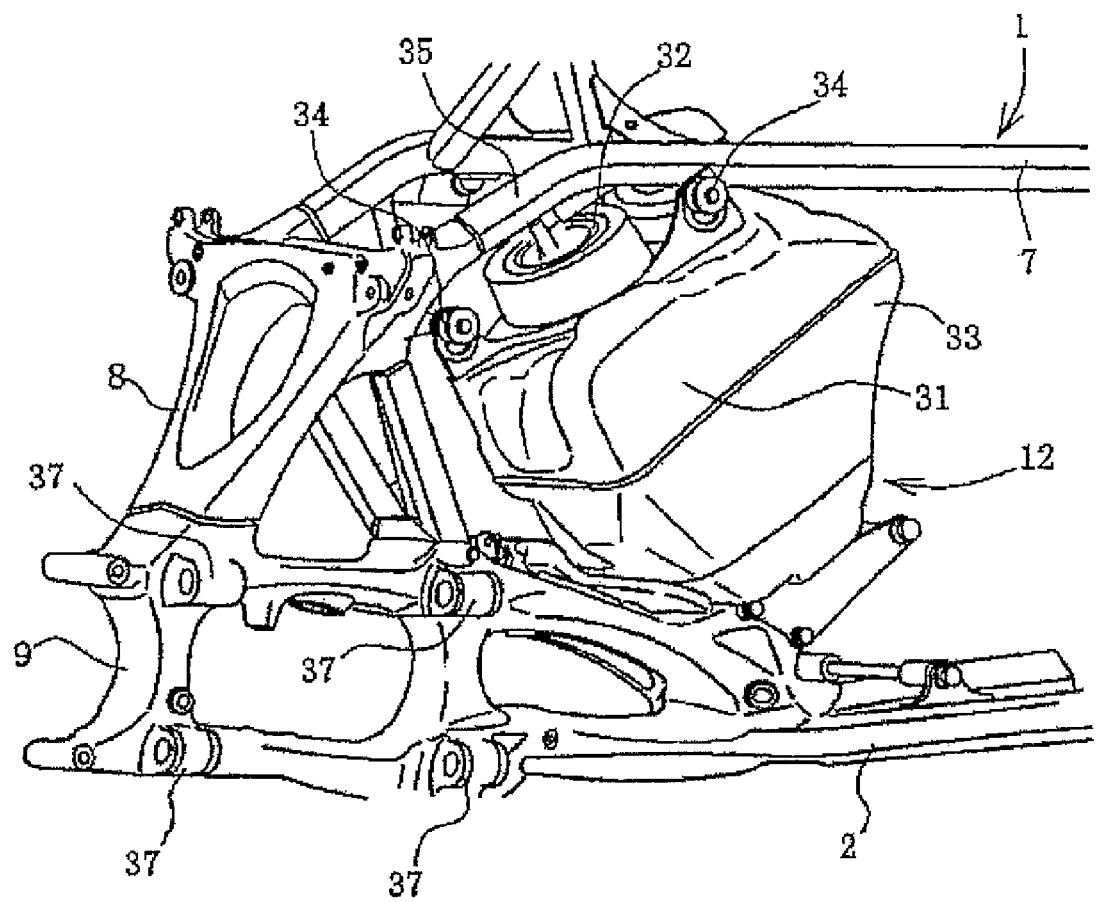
FIG. 3 is a perspective view of a fuel-tank side.

FIG. 3 is a perspective view illustrating the arrangement of the side where the fuel tank 12 is located. The fuel tank 12 is supported so as to tilt forwards at two positions, one in front to the front frame 8 and the other at the rear to the upper frame 7, of the upper portion thereof with rubber mounts 34, each of which is provided at each side of each position for absorbing the vibration. The fuel pump 32 is positioned below an inclining portion 35 formed so as to incline to be the front end portion of the upper frame 7 and connecting to the front frame 8. A supporting part 37 for the suspension arm 36 is provided.

Figure 4:
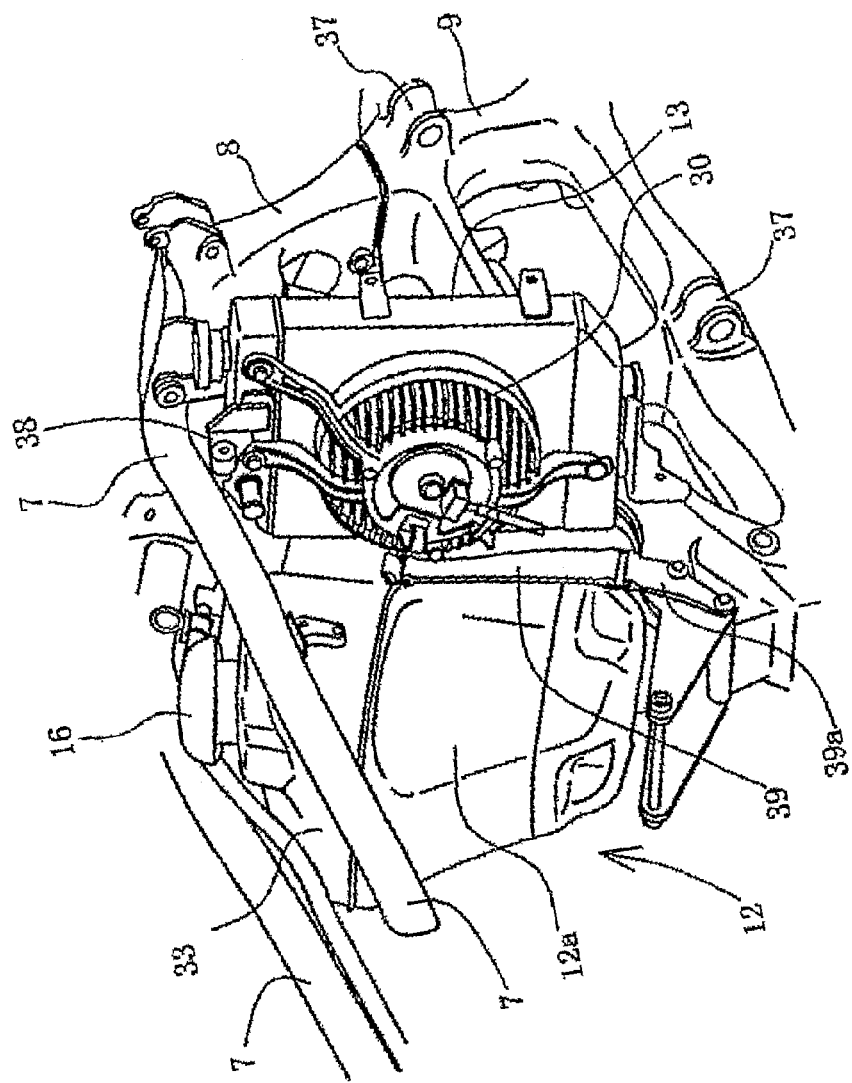
FIG. 4 is a perspective view of a radiator side when viewed obliquely from the rear.

FIG. 4 is a perspective view illustrating, when viewed obliquely from the rear, the side where the radiator 13 is located. FIG. 4 clearly shows that the fuel tank 12 and the radiator 13 are disposed so as to be distributed respectively on the two sides of the vehicle body, one on the left and the other on the right. The radiator 13 is formed with its vertical side longer than the horizontal side, and is positioned alongside the right-hand side of the inward-stretching portion 33. The cooling fan 30 is provided with a width barely fitting within the narrower side of the radiator 13, that is, the right-and-left side of the radiator 13. A stay 38 is provided to rubber-mount the radiator 13 to the upper frame 7. A clearance recessed portion 12a is formed on the back-side surface of the fuel tank 12. The inner-side end portion of the rear end of the inward-stretching portion 33 of the fuel tank 12 is linked to and fixed to a bracket 39a formed in the bottom portion of the body frame with a band 39.

Figure 5:
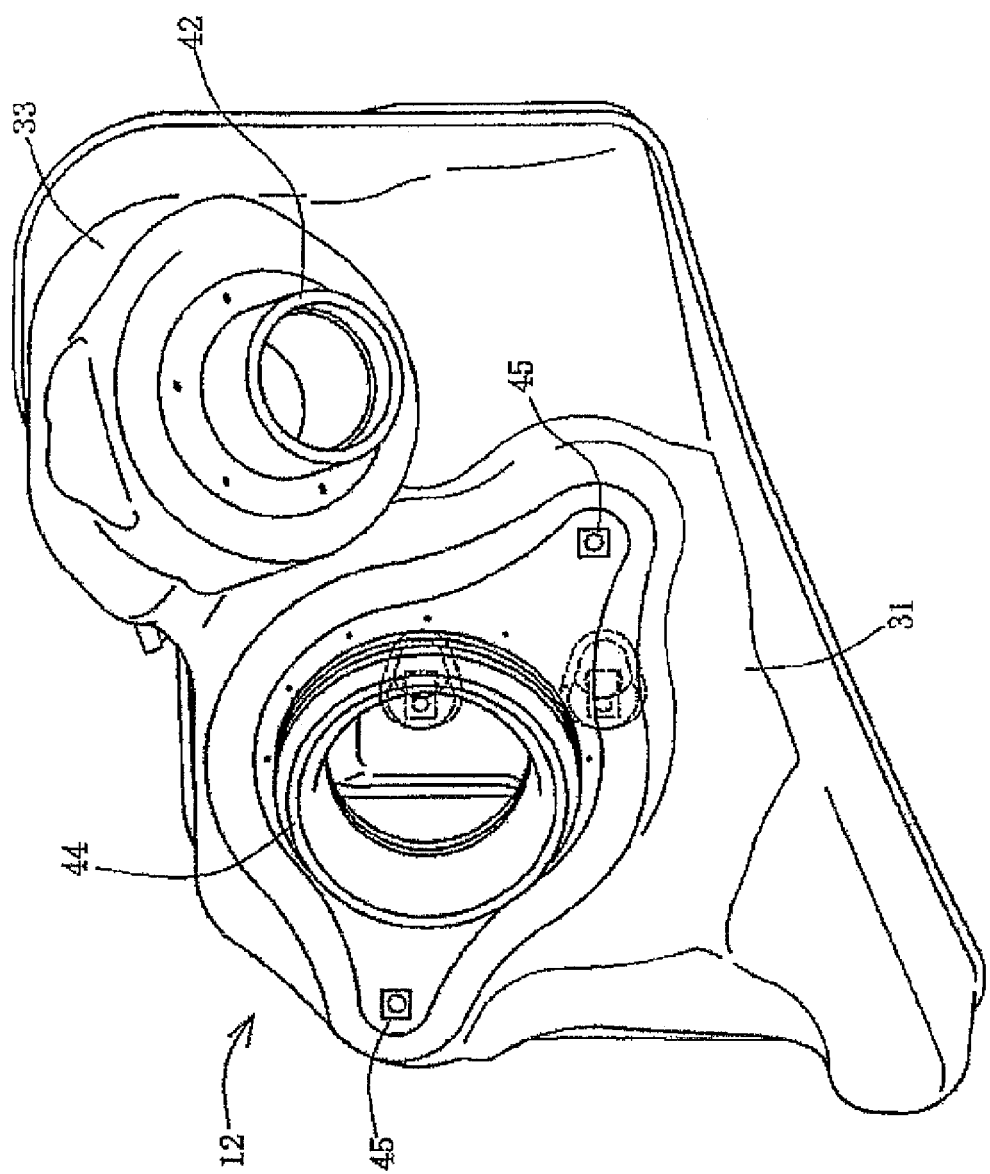
FIG. 5 is a top plan view of the fuel tank.

FIG. 5 is a top plan view of the fuel tank 12. The inward-stretching portion 33 outstretches towards the center of the vehicle body slightly more than the forward-stretching portion 31. From the inward-stretching portion 33, a filler mouth 42 obliquely sticks out so as to be oriented to the left-hand side of the vehicle body. The left-hand side surface of the fuel tank 12 extends obliquely with its front side stretching outwards and its rear side receding toward the center of the vehicle body.

An attachment hole 44 is provided to attach the fuel pump 32. The entire top surface of the forward-stretching portion 31 serves as an attachment portion for the fuel pump 32. Attachment portions 45, each of which has a nut incorporated thereinto, are provided at positions on a diagonal line.

Figure 6:
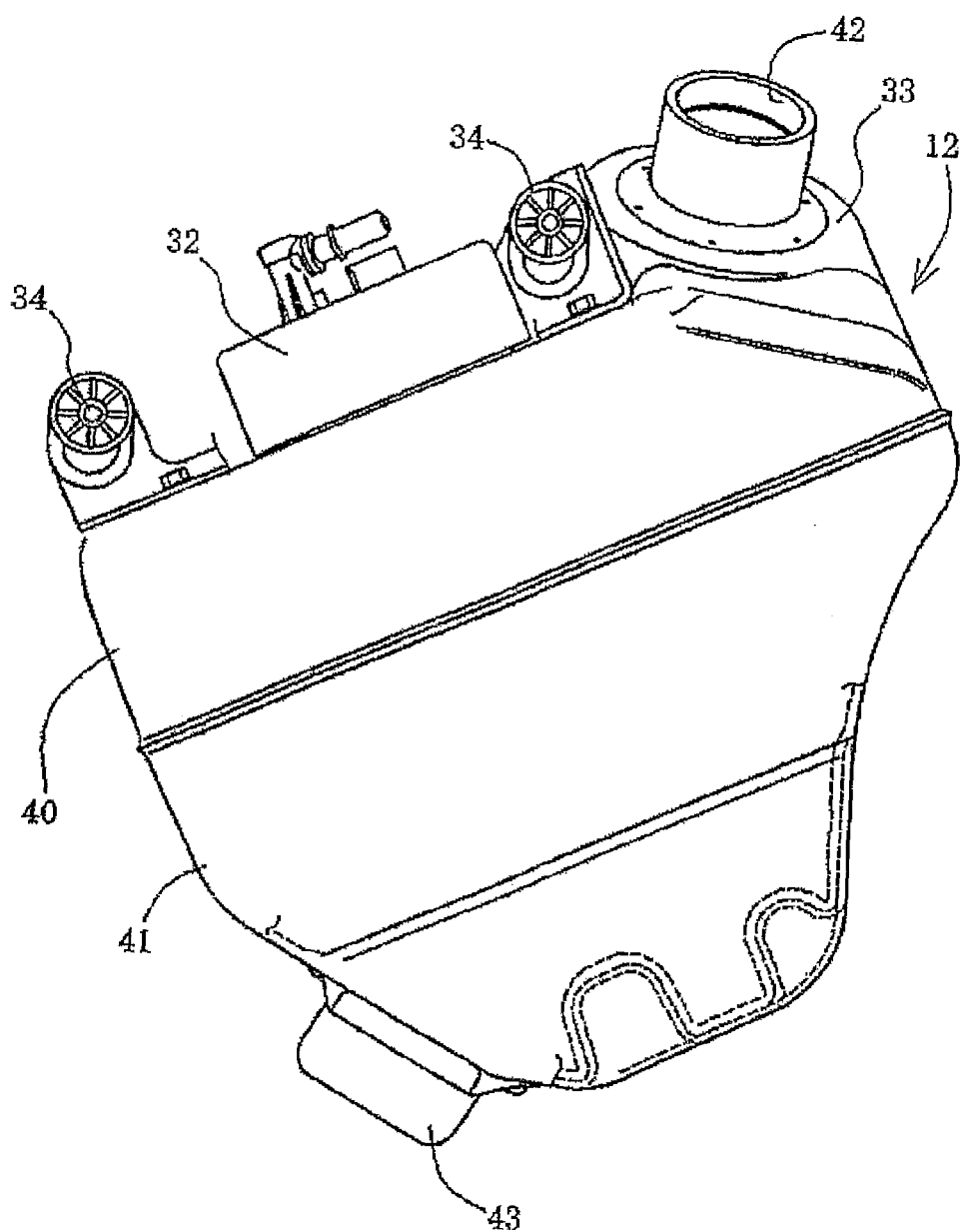
FIG. 6 is a side elevation view of the fuel tank.
Figure 7:
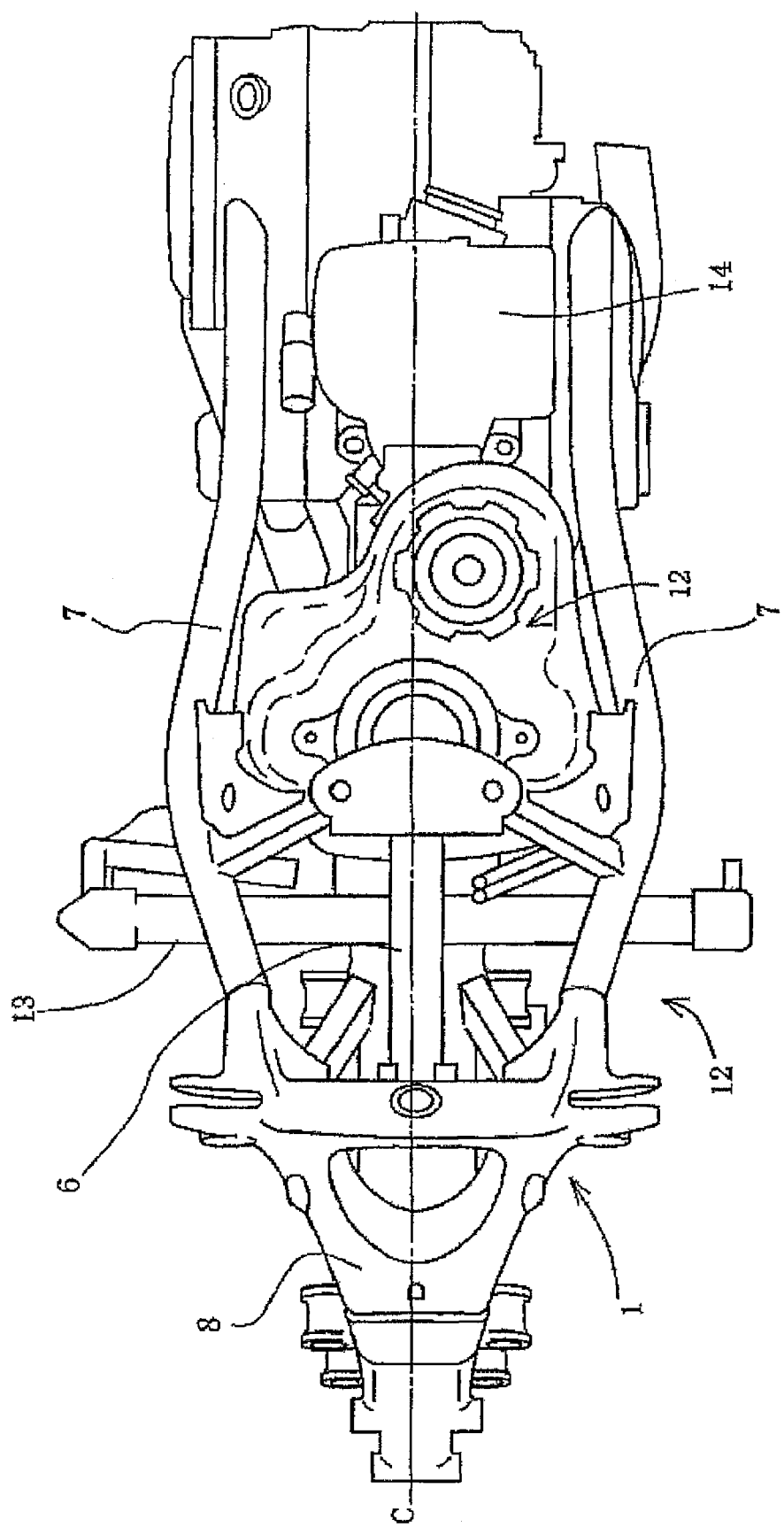
FIG. 7 is a top plan view of a principal part of a second vehicle.
Figure 8:
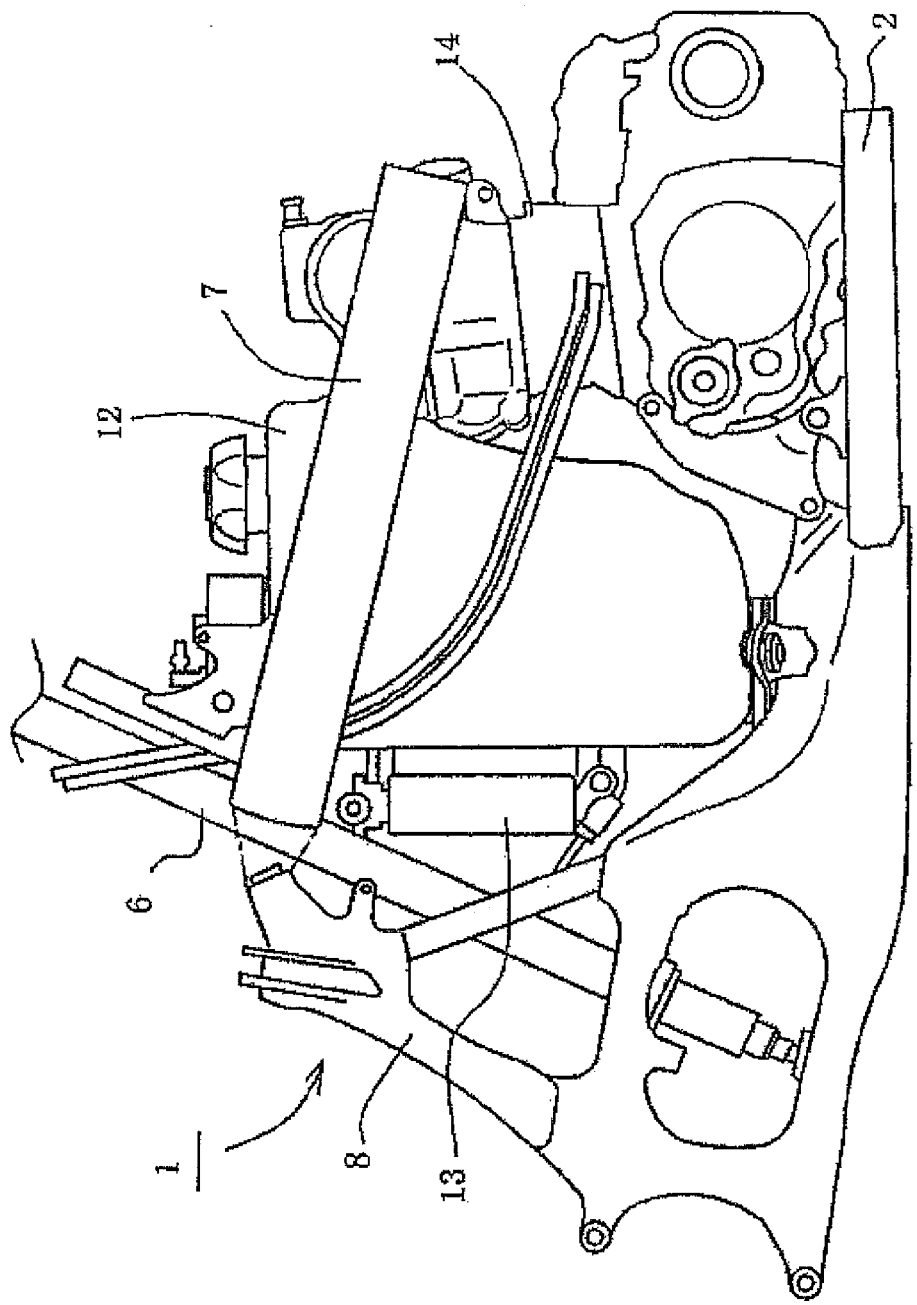
FIG. 8 is a side elevation view of the principal part of the second vehicle.
Figure 9:
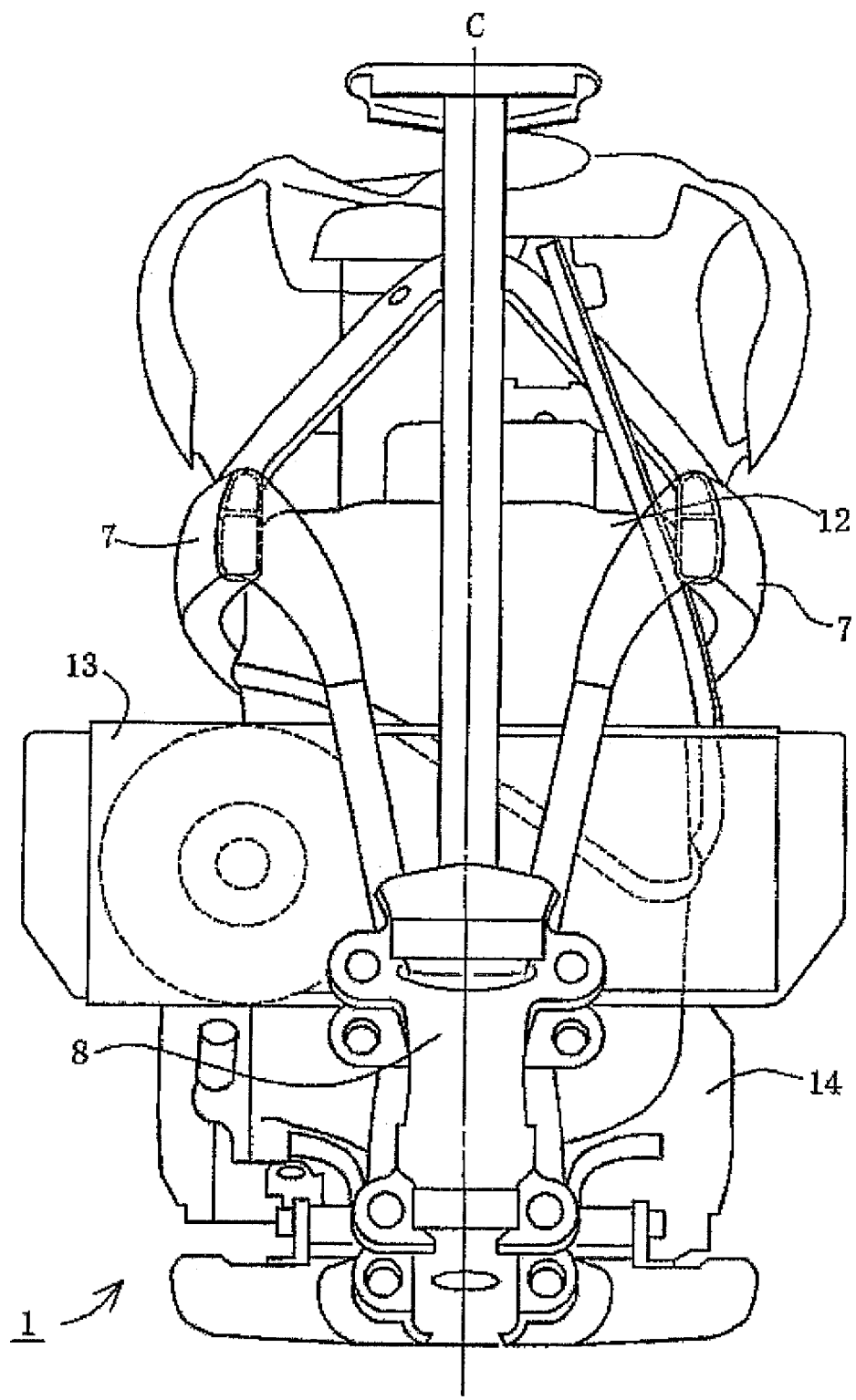
FIG. 9 is a front elevation view of the principal part of the second vehicle.
Figure 10:
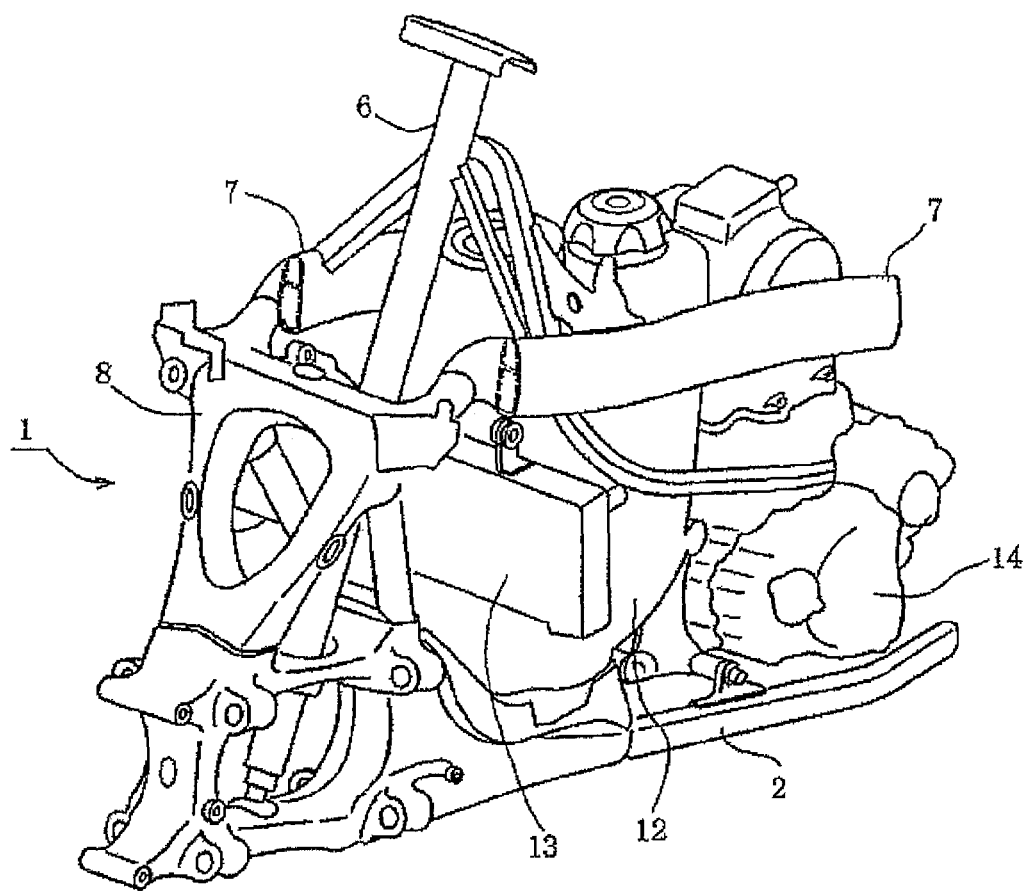
FIG. 10 is a perspective view of the principal part of the second vehicle.
Figure 11:
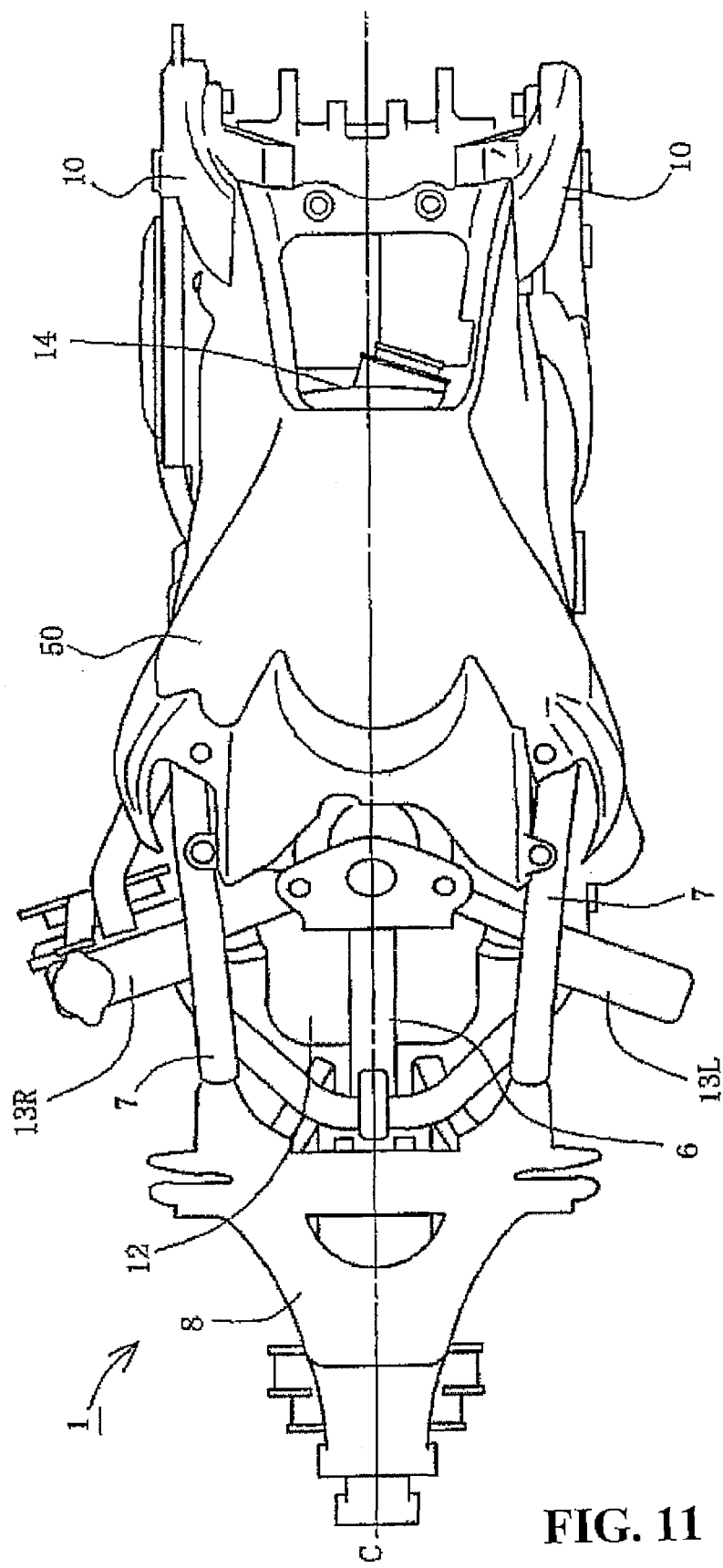
FIG. 11 is a top plan view of a principal part of a third vehicle.
Figure 12:
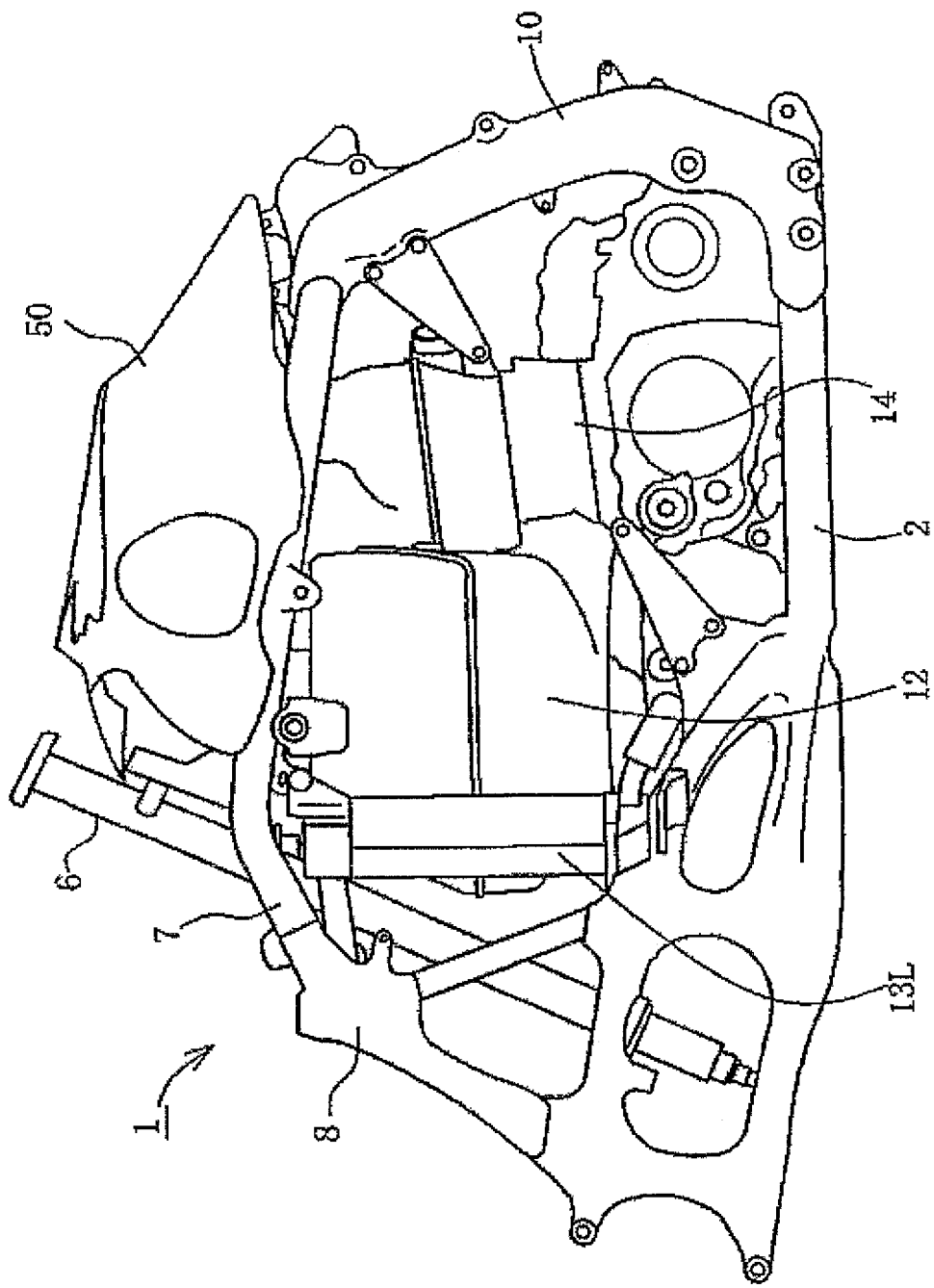
FIG. 12 is a side elevation view of the principal part of the third vehicle.
Figure 13:
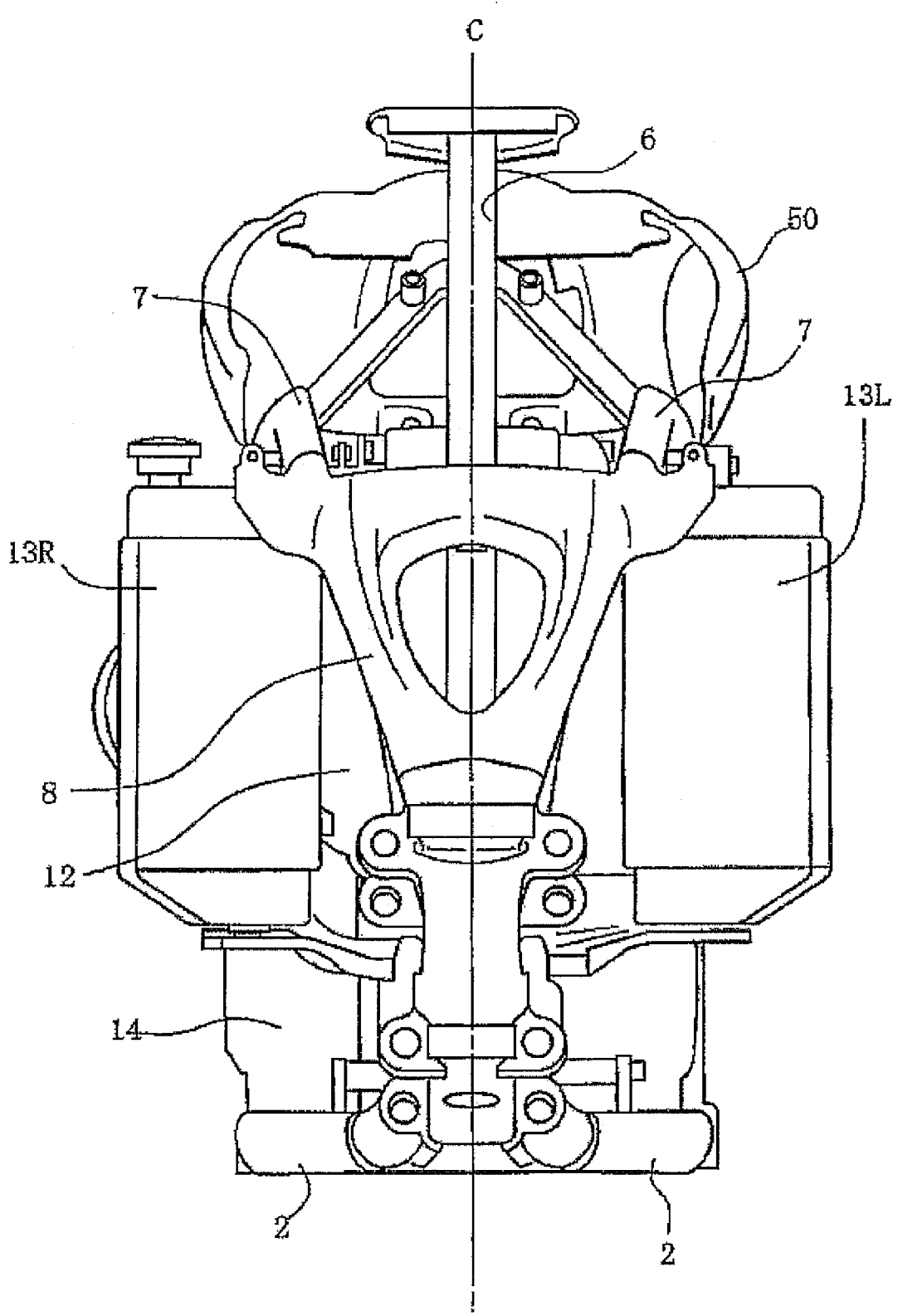
FIG. 13 is a front elevation view of the principal part of the third vehicle.
Figure 14:
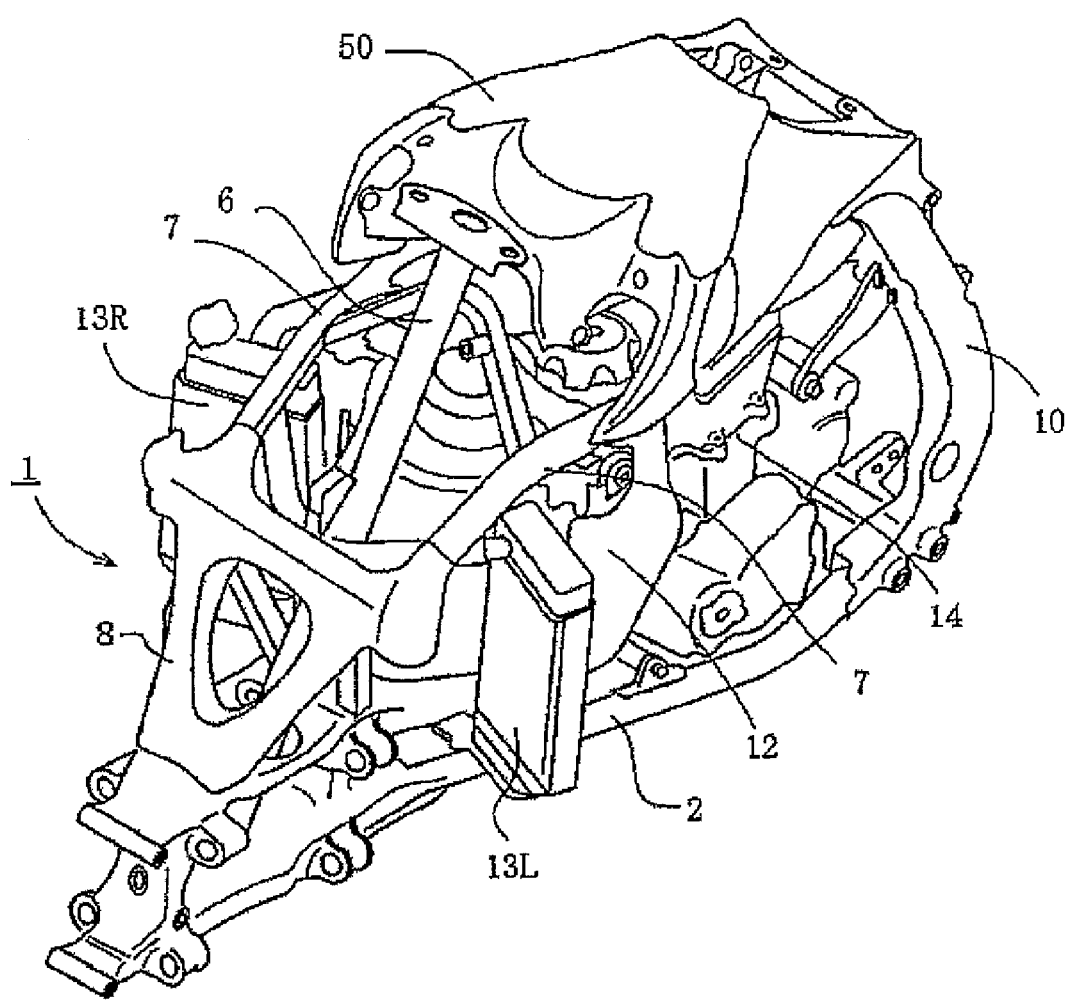
FIG. 14 is a perspective view of the principal part of the third vehicle.

FIG. 6 is a side elevation view of the fuel tank 12. The fuel tank 12 is composed of an upper member 40 and a lower member 41 which are joined together from above and below. The fuel pump 32 is provided at the center of the top surface of the upper member 40. The rubber mounts 34 are attached respectively at the front side and at the rear side of the fuel pump 32. The filler mouth 42 is provided at the highest point of the upper member 40 in a state where the fuel tank is attached to the vehicle body (the state illustrated in FIG. 6), and a cap is detachably attached to the filler mouth 42.

The lower member 41 has a shape narrowing downwards. A supporting boss 43 sticks out downwards from the lower most portion of the lower member 41. By fitting the supporting boss 43 into an unillustrated supporting recessed portion formed in the suspension frame 9, the position of the lower member 41 is determined and thus the lower member 41 is supported.

Subsequently, the effects of this embodiment will be described. As is clearly shown in FIG. 1 and the like, the fuel tank 12 and the radiator 13, both of which are heavy in weight, are disposed at the front side of the engine 14. Accordingly, the mass of the vehicle can be kept at a low position and can be concentrated. In addition, a further concentration of mass can be achieved by disposing the fuel tank 12 and the radiator 13 between the front suspension arm 36, which supports the front wheels, and the engine 14. Moreover, the fuel tank 12 and the radiator 13 can be disposed while avoiding an interference with the suspension systems.

In addition, the body frame 1 includes the right-and-left pair of the upper frames 7 and the right-and-left pair of the lower frames 2 with the engine 14 being supported between the upper frames 7 and the lower frames 2. Moreover, the fuel tank 12 and the radiator 13 are positioned below the upper frames 7. Accordingly, the center of mass can be kept at a lower position.

In addition, the fuel tank 12 and the radiator 13 are disposed so as to be distributed respectively on the two sides of the vehicle body, one on the left and the other on the right. This arrangement helps to secure an air ventilating path that leads to the radiator 13 while the fuel tank 12 of a larger capacity is disposed. In addition, the arrangement helps to balance the weight in the right-and-left direction.

In addition, a part of the fuel tank 12 and a part of the radiator 13 outstretch respectively beyond the left-hand and the right-hand upper frames 7. This arrangement allows the fuel tank 12 and the radiator 13 to have larger capacities, and helps to secure a ventilating path that leads to the radiator 13.

Moreover, the exhaust pipe 23 is located at the rear of the radiator 13 so that the exhaust pipe 23 is exposed to the wind delivered by the radiator 13. Thus, the cooling down of the exhaust pipe 23 can be promoted.

In addition, the refilling cap 16 of the fuel tank 12 is disposed so as to stick out of the front fender 17a. Accordingly, the fuel tank 12 can extend in the upward direction of the vehicle body so that the fuel tank 12 can have a larger capacity.

In addition, electric equipment such as the battery 18 and the ECU 19 is disposed so as to be supported above the engine 14 by the upper frames 7 and is covered by a top cover 7b. Such an arrangement can contribute to the concentration of mass. In addition, the electric equipment can be disposed at a place where the splashed water is unlikely to reach. As a result, the waterproofing performance of the supporting system for the electric equipment is enhanced. Note that the battery 18 and the ECU 19 mentioned here are mere examples of the electric equipment. Various types of electric equipment other than the battery 18 and the ECU 19 can be disposed in this way.

FIGS. 7 to 10 relate to a second embodiment of the invention, and to a four-wheel buggy vehicle as in the case of the first embodiment. To those components that are common to this embodiment and the previous one, the same reference numerals are given, and a detailed description of the components will not be duplicated.

As shown in FIGS. 7 to 10, a right and a left upper frames 7, 7 are disposed symmetrically with respect to a vehicle-body center line C, and a fuel tank 12 is disposed at the center of the vehicle body so as to be sandwiched between the right and the left upper frames 7, 7. Placed at this position, the fuel tank 12 can have a sufficiently large capacity. In this embodiment, the fuel tank 12 is placed between the right and the left upper frames 7, 7 and, in addition, at a position where the upper frames 7, 7 are curved and stretch most outwardly. Such an arrangement allows the fuel tank 12 to have a larger capacity.

A radiator is placed at the front side of the fuel tank 12. The long radiator 13 extends in the right-and-left direction across the right and the left upper frames 7, 7.

An engine 14 is placed at the rear of the fuel tank 12.

The radiator 13 has a small length from the top to the bottom, and is supported at the front side of the fuel tank 12 with a small distance left in between. The radiator 13 and the fuel tank 12 are placed at the rear of a steering shaft 6 and at the front of the engine 14.

In this arrangement, the fuel tank 12 and the radiator 13 are disposed so that one is positioned at the front of the other. Accordingly, even when the fuel tank 12 with a large capacity is utilized, the fuel tank 12 is fitted between the two upper frames 7, 7 and the radiator 13 is allowed to have an out-extending portion that sticks out beyond the upper frames 7, 7. Such an arrangement helps to secure an air ventilating path that leads to the radiator 13. In addition, the mass of the vehicle can be kept at a low position and can be concentrated as well.

FIGS. 11 to 14 are drawings related to a third embodiment of the invention. As shown in FIGS. 11 to 14, the radiator is separated into a right-side radiator 13R and a left-side radiator 13L, which are disposed so as to be distributed respectively on the right and the left sides of the vehicle body. The right-side and the left-side radiators 13R and 13L outstretch beyond the respective upper frames 7, 7, and are placed obliquely inwards so as to make the inner end of each radiator to be directed towards the center of the vehicle body. At the rear side of the radiators, a fuel tank 12 with a large capacity is located. The front portion of the fuel tank 12 enters between the right-side and the left-side radiators 13R and 13L. The right-side and the left-side radiators 13R and 13L are placed at the respective sides of the fuel tank 12. An engine 14 is disposed at the rear of the fuel tank 12. In addition, a steering shaft 6 is disposed at the front of the right-side and the left-side radiators 13R and 13L and of the fuel tank 12.

In the above arrangement, the fuel tank 12 is disposed at the center of the vehicle body while the radiator is now divided into the right-side radiator 13R and the left-side radiator 13L to be disposed at the right-hand side and the left-hand side of the fuel tank 12, respectively. Accordingly, while a large capacity can be secured for the fuel tank 12, the mass of the vehicle can be kept at a low position and an air ventilating path that leads to the radiator 13 can be secured. Such an arrangement also helps to balance the weight in the right and left direction. Since the fuel tank 12, which can be made much heavier than the radiator, is placed near the center of the vehicle body, it is expected that the mass is to be concentrated. Member 50 improves the external appearance. Member 50 is supported above the upper frames 7 so as to cover the fuel tank 12 and the engine 14 from above.

It should be noted that the invention of the present application is not limited to the embodiments described thus far. Various modifications and applications are possible within the principle of the invention. For example, when priority is given to the securing of the ventilation path and the concentration of the mass, the fuel tank and the radiator can be disposed so as to be divided vertically, one above the other. More specifically, while the fuel tank with a large capacity is placed below, a ventilation path for the radiator can be secured above the fuel tank. In addition, such an arrangement facilitates the balancing of weight in the right-and-left direction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A four-wheel vehicle in which front wheels are respectively disposed in a right-hand side and a left-hand side of a vehicle body frame, and rear wheels are disposed in a right-hand side and a left-hand side with an engine supported above the vehicle body frame, comprising:
   a steering shaft that controls the front wheels for steering, said steering shaft extends in an up-and-down direction at the front of the vehicle body frame and is supported by the vehicle body frame;
   a fuel tank disposed at a rear of the steering shaft and at a front of the engine; and
   a radiator disposed at the rear of the steering shaft and at the front of the engine,
   wherein a part of the fuel tank and a part of the radiator stretch outwards beyond the right and left frames when viewed from above.

2. The four-wheel vehicle according to claim 1, wherein the fuel tank and the radiator are disposed between the engine and a suspension arm that supports the front wheels.

3. The four-wheel vehicle according to claim 1, wherein the body frame includes a right-and-left pair of upper frames and a right-and-left pair of lower frames,
   the engine is supported between the upper frames and the lower frames, and the fuel tank and the radiator are positioned below the upper frames.

4. The four-wheel vehicle according to claim 1, wherein a filler mouth of the fuel tank is provided on a front fender.

5. The four-wheel vehicle according to claim 1, wherein electric equipment is disposed above the engine so as to be supported by the body frame.

6. The four-wheel vehicle according to claim 1, wherein an exhaust pipe is disposed at the rear of the radiator.

7. A four-wheel vehicle in which front wheels are respectively disposed in a right-hand side and a left-hand side of a vehicle body frame, and rear wheels are disposed in a right-hand side and a left-hand side comprising:
 an engine supported above the vehicle body frame, said engine having a front and a rear surface;
 a steering shaft for controlling the front wheels for steering, said steering shaft extending in an up-and-down direction at a front of the vehicle body frame and being supported by the vehicle body frame;
 a fuel tank disposed to a rear of the steering shaft and in front of the engine; and
 a radiator disposed to the rear of the steering shaft and in front of the engine,
 wherein a part of the fuel tank and a part of the radiator stretch outwards beyond the right and left frames when viewed from above.

8. The four-wheel vehicle according to claim 7, wherein the fuel tank and the radiator are disposed between the engine and a suspension arm that supports the front wheels.

9. The four-wheel vehicle according to claim 7, wherein the body frame includes a right-and-left pair of upper frames and a right-and-left pair of lower frames,
 the engine is supported between the upper frames and the lower frames, and
 the fuel tank and the radiator are positioned below the upper frames.

10. The four-wheel vehicle according to claim 1, wherein the fuel tank and the radiator are disposed by distributing one of the fuel tank and the radiator on the right-hand side and the other on the left-hand side.

11. The four-wheel vehicle according to claim 7, wherein the fuel tank and the radiator are disposed by distributing one of the fuel tank and the radiator on the right-hand side and the other on the left-hand side.

* * * * *